United States Patent [19]
Spicer

[11] Patent Number: 5,169,662
[45] Date of Patent: Dec. 8, 1992

[54] DIETARY PRODUCT AND METHOD FOR MANUFACTURE

[75] Inventor: Arnold Spicer, Palma/Mallorca, Spain

[73] Assignee: New Generation Foods, Inc., Oglesby, Ill.

[21] Appl. No.: 508,486

[22] Filed: Apr. 10, 1990

Related U.S. Application Data

[63] Continuation-in-part of Ser. No. 387,850, Aug. 31, 1989, abandoned.

[51] Int. Cl.⁵ .................................................. A23P 1/14
[52] U.S. Cl. .................................. 126/449; 426/450; 426/559; 426/621; 426/625
[58] Field of Search ................. 426/93, 618, 619, 620, 426/621, 625, 449, 450, 559, 804

[56] References Cited

U.S. PATENT DOCUMENTS

| | | | |
|---|---|---|---|
| 1,756,921 | 7/1988 | Calandro et al. | 426/620 |
| 3,851,081 | 11/1974 | Epstein | 426/559 |
| 3,998,978 | 12/1976 | Lawrence et al. | 426/621 |
| 4,247,573 | 1/1981 | Murray et al. | 426/657 |
| 4,259,359 | 3/1981 | Spicer | 426/559 |
| 4,315,954 | 2/1982 | Kuipers et al. | 426/804 |
| 4,350,714 | 9/1982 | Duvall | 426/559 |
| 4,438,146 | 3/1984 | Colby et al. | 426/625 |
| 4,497,840 | 2/1985 | Gould et al. | 426/619 |
| 4,526,800 | 7/1985 | Howard | 426/625 |
| 4,568,557 | 2/1986 | Becker et al. | 426/618 |
| 4,620,981 | 11/1986 | Gordon et al. | 426/449 |
| 4,711,786 | 12/1987 | Schmidt | 426/653 |
| 4,752,493 | 6/1988 | Moriki | 426/446 |
| 4,759,942 | 7/1988 | Von Fulger | 426/449 |
| 4,777,045 | 10/1988 | Vanderveer et al. | 426/808 |
| 4,935,251 | 6/1990 | Verhoef et al. | 426/549 |
| 5,009,916 | 4/1991 | Colliopoulos | 426/804 |
| 5,015,490 | 5/1991 | Van Lengerich et al. | 426/518 |

FOREIGN PATENT DOCUMENTS

| | | |
|---|---|---|
| 1122849 | 5/1982 | Canada . |
| 2055545 | 3/1981 | United Kingdom . |

*Primary Examiner*—Carolyn Paden
*Attorney, Agent, or Firm*—Fitch, Even, Tabin & Flannery

[57] ABSTRACT

An improved dietary food product made from ground grain source material in expanded form, comprising more than 10 percent protein and more than 20 percent dietary fiber including from about 55 percent to 70 percent soluble dietary fiber and 30 percent to 45 percent insoluble dietary fiber, the food product having a calorie content of from about 250 to about 350 calories per 100 grams and being expanded from about 1:3 to 1:5 times.

17 Claims, No Drawings

DIETARY PRODUCT AND METHOD FOR MANUFACTURE

The present application is a continuation-in-part of U.S. patent application, Ser. No. 387,850, filed Aug. 31, 1989, which is now abandoned.

FIELD OF THE INVENTION

The present invention relates to an improved dietary product and to a method for manufacture thereof and, more particularly, the present invention relates to an expanded dietary oat product comprising oat bran and to a method for making such products.

BACKGROUND OF THE INVENTION

Food products have been produced for many years from grains and various grain products have been produced in expanded form, such as puffed wheat and puffed rice. Many snack foods and breakfast cereals are known which are made from dough, including ground grain, which is expanded in various ways including extrusion. Generally, such products do not provide balanced nutrition or serve dietary purposes. However, one outstanding dietary product has been manufactured from whole wheat and is disclosed in U.S. Pat. Nos. 4,254,359 and 4,438,146. Thus, product has been sold and marketed under the trademark NUTRI-WHEAT by Spicers International and has been established as an outstanding dietary product. See: *Use of an Expanded-Whole-Wheat Product in the Reduction of Body Weight and Serum Lipids in Obese Females*, by Marianna K. Fordyce-Baum, et al, *The American Journal of Clinical Nutrition*, 1989; 50:30–6.

Recently, oat bran has been identified as a highly desirable food. Oat bran has been found to lower or eliminate insulin requirement for diabetics. Oat bran helps to prevent heart disease and serves to limit the development of arteriosclerosis. The use of oat bran in the diet provides dietary supplements which have been found very effective for many diseases. The work of Dr. James Anderson is particularly notable, some of which is reported in *Journal of the Canadian Dietetic Association*, Vol. 45, No. 2, Apr. 1984; *The American Journal of Clinical Nutrition* 40: pp. 1146–1155, Dec. 1984; *Nutrition and Diabetes*, Chapter 8, 1985; and *Nutrition Update*, Vol. 2, Chapter 3, 1985. Oat bran in expanded form would be particularly desirable for human ingestion because of its therapeutic effects in such form. Expanded oat bran serves to sensitize insulin receptors, particularly in muscle. Oat bran slows down transport of food in the intestinal tract, and particularly in the small intestine, and serves to promote desired fermentation in the colon and lower cholesterol and blood pressure.

In summary, it is most desirable for humans to ingest oat bran in expanded form. It is also known that humans should ingest substantial amounts of soluble dietary fiber and oat bran includes significant amounts of soluble dietary fiber and corn bran includes large amounts of dietary fiber a substantial portion of which is soluble dietary fiber. However, products with significant amounts of soluble dietary fiber are difficult to expand, and oat bran and corn bran do not lend themselves to expansion from known doughs by known processes.

Further, oat bran does not in itself offer a balanced meal and it would be desirable to provide oat bran in human diets in a nutritionally balanced product and in an expanded form.

The problem of manufacture of an expanded snack product from bran or an oat cereal is exemplified in U.S. Pat. No. 4,620,981 to Gordon, et al. In this patent, a method is disclosed for making a highly expanded porous oat product. The method is complex and includes the step of classifying an oat flour, i.e., an oat flour produced from oat groats, to separate out a low beta-glucan oat flour with a beta-glucan content of less than about 3.3 percent. In other words, this patent recognizes the difficulty of producing an expanded snack product from oats which contain a substantially high level of beta-glucan in the form of soluble fiber. Further steps of this patent include cooking a mix comprising the low beta-glucan oat flour portion comprising at least about 55 percent of cereal flour in the mix, expanding and shaping the cooked mix into a shaped cereal product, heat setting the shaped cereal product to a moisture content at which it is structurally stable. The final moisture content is indicated to be at a level of from 2 to 4 percent.

U.S. Pat. No. 4,759,942 to Von Fulger describes a process for producing a ready-to-eat cereal, which is expanded cereal dough which incorporates a bran material having a specific average particle size of from 5 to 100 microns. The expanded cereal has a specific density of from 0.15 to 0.40 gms/cc. The process of the Von Fulger patent indicates that the cereal doughs of the process require the use of higher moisture levels (16–30%) than conventional cereal doughs (14–18%) which are intended to be expanded. There is no specific description in the Von Fulger patent of a process to produce an expanded product having a high level of oat bran and the examples relate only to a process for producing an expanded cereal product from micromilled wheat bran.

It is acknowledged that there are many food products available in the food industry which are derived from grains such as wheat, rice, corn, oats and the like to provide dietary products, food supplements and snack foods. Various pieces of equipment and processes have been developed to expand grain products to provide several types of food products, such as ready-to-eat cereals and snack foods. Snack foods have been provided heretofore in expanded form wherein the product is either first cooked to provide a dough which is later extruded or which is provided as an uncooked dough which is cooked in an extruder. The expansion of gas or steam within the dough as it exits out of the extruder from a zone of high pressure to a zone of low pressure results in the formation of an expanded food product. Food products which are from high protein wheat are disclosed in U.S. Pat. No. 4,259,359 and in U.S. Pat. No. 4,438,146.

U.S. Pat. No. 4,526,800 to Howard discloses cereal snack foods in expanded form which are prepared from a dough which includes cooked portions of a dough composition which includes gelatinized starch. The dough composition also includes a minor amount of cereal bran which has been heat-treated to destroy the amylase therein. The bran is selected from common cereal brans, other than rice bran. Reduction of the amylytic activity of the bran is required as well as the presence of 5 percent by weight of oil. Cereal bran, is, of course, only a part of the whole cereal seed, which also includes endosperm and germ.

U.S. Pat. No. 4,315,954 to Kuipers et al. discloses a dietary snack product which includes a fiber containing substance, such as wheat bran. The fiber containing substance is mixed with a protein which is plastifiable to a gel under extruding conditions, such as milk protein (casein). The use of such plastifiable proteins in the presence of small quantities of sugars lead to enzymatic browning under the temperature and extrusion conditions required to provide an expanded snack product. Furthermore, since all proteins have considerable water binding capacity, the incorporation of a protein gel into a dough leads to considerable difficulty in releasing the amount of water required to form an expanded cereal product.

The prior art methods and processes, however, have not provided successful and convenient techniques for the processing of doughs wherein a major amount of the cereal portion is provided from oat bran and corn bran, i.e., high sources of soluble fiber, to make them into balanced dietary products.

Accordingly, a principle object of the present invention is to provide an improved dietary product for human consumption.

A further object of the invention is to provide a balanced dietary product which comprises a high level of soluble dietary fiber and a substantial amount of oat bran.

A still further object of the invention is to provide a method for making improved dietary expanded product which can be processed in conventional equipment.

Still further objects and advantages of the invention can be learned from the following disclosure.

SUMMARY OF THE INVENTION

In accordance with the present invention, a method is provided for the manufacture of an expanded dietary product. The method includes the steps of preparing an uncooked dough mix which includes ground oat bran, corn bran and corn meal. The moisture level of the dough, including free and bound water is adjusted to a total level of from about 14 to 18 percent by weight of the dough mix. The uncooked dough mix is cooked under predetermined conditions of heat and pressure in an extruder so as to cause the dough mix to exit from the extruder at a total moisture level of from about 8 to about 12 percent. During the cooking step, the cooked dough mix expands to an extent of from about 3 to about 5 times the volume of the uncooked dough mix. Thereafter, the cooked dough mix is dried to provide a finished product with a maximum moisture of about 3 percent by weight, and preferably a moisture below 2.5 percent.

The product of the invention comprises, on a dry basis, oat bran at a level of from about 45 percent to about 55 percent; corn bran at a level of from about 17 percent to about 25 percent; corn meal at a level of from about 10 percent to about 25 percent; and triticale at a level of 0 percent to about 10 percent. All percentages used herein are by weight, unless otherwise indicated. The levels are adjusted to provide a high protein product comprising more than 10 percent protein and more than 20 percent dietary fiber of which about 55 percent to about 70 percent is soluable dietary fiber and about 30 percent to about 45 percent is insoluble dietary fiber. The levels are also preferably adjusted to provide the product of the invention with a calorie content of about 250 to about 350 calories per 100 grams. As indicated, the dietary product is expanded to a ratio of 1:3 to 1:5 to obtain the desired effects.

The ingredients are ground to a mesh size between 40 mesh and 60 mesh for inclusion into the dough. Finer grinds are preferred to avoid problems during extrusion and to promote digestion. Since the ingredients are naturally occurring, they vary somewhat in their analyses depending in part on the season of the year, growing conditions, etc. However, typical analyses of the ingredients are as follows:

|  | Bran | Oat Bran | Corn Meal | Corn Triticale |
|---|---|---|---|---|
| Protein | 18-20 | 4-6 | 7-9 | 14-18 |
| Fat | 9-10 | 3-5 | 9-11 | 1-2 |
| Moisture | 10 max | 11 max | 11 max | 13 max |
| Ash | 2.5-3.0 | .75-1.25 | .25-.4 | 1.5-2.5 |
| Carbohydrates | 58-62 | 5-7 | 78-82 | 68 |
| Dietary Fiber | 14-16 | 82-84 | .4 | 12-14 |
| Insoluble | 8-9 | 26-27 | — | 10.8-12.6 |
| Soluble | 6-6.8 | 56-57 | — | 1.2-1.4 |
| Calories/100 gm | 344 | 50 | 282 | 350 |

The values stated above are in percentages, except for calories. The moistures are equilibrium moistures. Dietary fiber comprises polysaccharides and is determined by a specific test for dietary fiber. The test for dietary fiber is determined by the Prosky Method AOAC #43,A14. Soluble and insoluble dietary fiber are determined in accord with AOAC procedures. The soluble and insoluble dietary fiber total to the amount of dietary fiber.

The oat bran is the major component of the dietary product of the invention and provides unique nutritional advantages to the product, as above noted. Further, it provides a significant amount of soluble dietary fiber. However, the oat bran will not readily expand and lacks a high level of soluble dietary fiber to provide the desired therapeutic effects. It has been found that the invention may also be enjoyed by substituting barley bran for oat bran. Barley bran comprises between about 30 percent and about 40 percent dietary fiber with more than 50 percent of the dietary fiber being in soluble form.

The corn bran is high in soluble dietary fiber but low in energy contribution to the product and it is difficult to expand and extrude.

Corn meal is high in carbohydrates and thereby provides energy to the product of the invention. Corn meal facilitates the expansion of the product to the desired degree.

Triticale, which is a natural cross between durum wheat and natural rye, provides protein and energy to the dietary product but further serves to improve processing of the dietary product as well as its texture. Triticale facilitates the preparation of a high protein product. Triticale is particularly important in commercial manufacture of the expanded dietary product and, although the product may be produced without triticale, it is preferably present at a level greater than 5 percent but need not exceed 10 percent. While higher levels can be used in processing, they are not necessary.

The ingredients are moistened to prepare the dough and the over-all moisture of the dough for extrusion is between about 14 percent and about 18 percent including the moisture in the ingredients. After expansion upon extrusion from an extruder the product will have about 10 percent moisture which should be reduced to below about 3 percent and preferably below 2.5 percent to maintain satisfactory storage life. Higher moistures in the end product result in mold and bacteria growth.

The dough is desirably flavored and sweetened, and various materials can be added to achieve these ends. Sweetness can be provided by the addition of sucrose, dextrose or fructose, which are used at levels to achieve desired sweetening. Generally, sweeteners will be at a level of less than 5 percent, dry basis, of the end product and usually will be less than 2 percent. However, the sweetener will not substantially increase the calorie content of the product. Many different flavorings may be included in the dough such as cinnamon, cheese and chocolate. Adequate flavoring is achievable without substantially raising the calorie content of the product of the invention. Salt may be added to taste.

The extruded dough, after drying, is desirably coated to improve the organoleptic properties and increase the calorie content. The coating may include an oil, such as corn oil, a sweetener, flavorings and surface active agent, such as lecithin. The coating should not raise the calorie content of the final product outside the range of 300 to 400 calories per 100 grams.

The product of the invention provides a meal replacement which has additional therapeutic effects through provision of oat bran in expanded form and high levels of soluble dietary protein. The product provides substantial energy in tasty, pleasing food.

DETAILED DESCRIPTION OF THE INVENTION

An uncooked dough mix is prepared which includes oat bran as the major amount of the cereal portion. Oat bran is the portion of the broken coat of the whole oat which is separated from the other oat components. The oat bran is ground to a particle size of from about 40 mesh to about 60 mesh. As used herein, the term "mesh" means American standard sieve size, unless otherwise indicated. Oat bran is present in the uncooked dough mix at a level of from about 45 percent to about 55 percent, preferably at a level of from about 47 percent to about 51 percent. As used herein, all percentages are by weight, dry basis, unless otherwise specified.

It has been determined that an expanded oat bran product cannot be produced by using oat bran alone. Extrusion problems and lack of expansion result even when oil is added to a dough mix formed from oat bran. Surprisingly, however, it has been found that the addition of a combination of corn bran and corn meal to a dough mix containing oat bran provides a product with excellent extrusion and expansion properties, even without the use of an edible oil to facilitate processing through the extruder die. The extrusion and expansion propereties are enhanced by inclusion of triticale in the dough.

Corn bran is a portion of the broken coat of the whole corn kernel which has been separated from the other kernel components. Corn bran, useful in the method of the present invention, has a particle size of from about 60 mesh to about 80 mesh. Corn bran is rich in soluble dietary protein, but will not extrude and expand as a result of its own properties.

Corn meal is produced by dry milling of corn. In general, there are two commercial processes for producing corn meal. In one process, whole corn is ground to a coarse meal between millstones run slowly at a low temperature. This type of corn meal is a whole corn product and, owing to the presence of the germ, has a rich oily flavor and deteriorates rapidly. In the second process, the object of dry milling is to remove the bran and germ and to recover the endosperm in the form of hominy or corn grits, coarse meal, fine meal and corn flour.

In an important embodiment of the present invention, it has been determined that the extrusion properties and the texture and digestibility of the expanded oat bran product is substantially enhanced by the inclusion of a small, but critical level of a suitable surface active agent, and an edible oil. The surface active agent is preferably present at a level in the range of from about 0.1% to about 0.4% and the edible oil is preferably present at a level of from about 0.5% to about 1%. The surface active agent is preferably a phospholipid such as lecithin. The addition of the surface active agent and the oil forms in oil in water emulsion in the dough. Unlike protein, the surface active agent does not bind water but overcomes the immuscibillity of oil and water to produce an emulsion which, it is believed, provides the improvements with respect to extrusion properties, texture and digestibility.

Definitions and standards of identity for dry-milled corn products have been established in the United States by the Food and Drug Administration (FDA). FDA standards are provided for corn meal, and corn flour. The corn meal used in the present invention is degerminated while or yellow corn meal having, on a moisture free basis, a crude fiber content of less than 1.2 percent, a fat content of less than 2.25 percent, a particle size such that not less than 45 percent passes through a No. 25 sieve and not more than 25 percent passes through a No. 72 xxx grits gauze. In general, the corn meal will have a particle size of from about 80 mesh to about 100 mesh.

Preferably, the corn bran is present in the uncooked dough mix at a level of from about 18 percent to about 25 percent, most preferably the corn bran is present at a level of from about 20 percent to about 23 percent. Preferably, the corn meal is present in the uncooked dough mix at a level of from about 10 percent to about 35 percent, most preferably, at a level of from about 16 percent to about 19 percent. Triticale, if present, is preferably at a level of from about 5 percent to about 10 percent.

The total moisture of the dough is adjusted by the addition of water so as to provide a total moisture level in the dough mix of betweend about 14 percent and about 18 percent, preferably from about 15 percent to about 17 percent. The moisture level specified herein includes both free and bound moisture. Generally, to attain the desired level of total moisture, water is added to the dough mix at a level of from about 6 percent to about 10 percent. The moisture serves to expand the dough upon extrusion and to aid in gelatinization of the ingredients.

The uncooked dough mix is processed in an extruder in accordance with the method and apparatus set forth and described in U.S. Pat. No. 4,438,246. In the method of this patent heating of the uncooked dough mix is effected in the extruder die. The temperature of the uncooked dough mix is increased to within the range of from about 150° F. to about 190° F. over a period of from about 1 minute to about 1.5 minutes to provide a cooked dough mix. During the cooking process the pressure on the dough mix is increased to within the range of from about 600 psi to about 900 psi. As the cooked dough mix exits from the extruder die, this pressure is released and the cooked dough mix expands to provide a cooked cereal product which has expanded in size to from about 3 to about 5 times the volume of the uncooked dough mix, preferably with an expansion of about 3 to about 5 times the volume of the uncooked dough, i.e., a specific density of from about 0.15 to about 0.30 grams per c.c.

The product exiting from the extruder die should have a total moisture of no higher than 12 percent in order to set the product. Preferably, the total moisture of the product exiting from the extruder is from about 8 percent to about 12 percent. The extruded product is then dried to a maximum moisture of 3 percent. Higher moistures than 3 percent limit the shelf life of the expanded oat product of the present invention. The temperature used in drying the extruded cooked dough mix product is between about 180° F. to about 250° F. and drying is effected in a time period of from about 3 minutes to about 6 minutes. The drying is sufficient to remove substantially all free moisture but allows bound moisture to be retained din the product. The process of drying is important to provide adequate shelf life for the expanded dietary product.

It should be understood that there is a substantial difference between the method of the present invention for providing an expanded dietary product and the prior art methods for the processing of wheat to provide expanded wheat products. First, it should be noted that the expanded dietary product of the invention is substantially free of cellulose and hemicellulose which are present in wheat. It should also be understood that one of the parameters required to achieve the desired processing of the uncooked dough mix of the present invention is that the oil and moisture levels must be at a lower level than is conventionally used in the production of expanded cereal products, such as wheat based products. Such lower level of oil and moisture is required in order to obtain a higher degree of texturization. The fat or oil level should be below about 1 percent. Uncooked dough mixes prepared from wheat advantageously use 1-3 percent oil and about 14-18 percent added moisture for extruding from the die of the extruder. Furthermore, conventional expanded wheat products have a higher level of mosture upon exiting from the die of the extruder and a lower moisture is needed for the expanded oat bran product of the invention to effect the desired set and maintain the expansion and texture of the dietary product of the invention.

The following examples further set forth various features of the invention.

EXAMPLE I

A base dough mix was prepared by mixing 150 pounds of oat bran, 62.5 pounds of corn bran, 50 pounds of corn meal and 25 pounds of triticale. The mix was moistened with 23.5 pounds of water.

The percentage composition of each of the ingredients analyzed as follows:

|  | Oat Bran | Corn Bran | Corn Meal | Triticale |
|---|---|---|---|---|
| Protein | 19.09 | 6.0 | 8.0 | 16.0 |
| Fat | 9.8 | 3.0 | .6 | 1.5 |
| Moisture | .8.35 | 11.0 | 11.0 | 13.0 |
| Ash | 2.82 | 1.0 | .0.3 | 2.0 |
| Carbohydrates | 59.90 | 79.0 | 80.0 | 68 0 |
| Dietary Fiber | 14.99 | 73.0 | .0.4 | 13.0 |
| Insoluble | 8.6 | 23.36 | — | 1.3 |
| Soluble | 6.39 | 49.64 | — | .11 |
| Calories | 344 | 50 | 282 | 350 |

Included in the dough for sweetening and flavoring were the following:

| | |
|---|---|
| Fructose (10 percent moisture) | 7.5 pounds |
| Cinnamon (7 percent moisture) | 7.0 pounds |
| Salt | .5 pounds |
| Lecithin | .15 pounds |
| Total | 15.15 pounds |

This comprised about 4.65 percent of the dough mix.

The dough mix was thoroughly mixed as disclosed in the method of U.S. Pat. No. 4,438,146 to provide uniform distribution of the ingredients throughout the dough and to provide an uncooked dough mix. The uncooked dough mix was subjected to a pressure of about 900 psi and to a temperature of about 180° F. while in the extruder to provide a cooked dough mix. The cooked dough mix exited from the extruder and expanded to 4 times the volume of the uncooked dough mix so as to provide the expanded oat bran dietary product of the invention.

The expanded dough mix had a moisture of about 10 percent. A coating of the following formulations was thend applied:

| | |
|---|---|
| Corn Oil | 70.00 pounds |
| Fructose (10 percent moisture) | 30.00 pounds |
| Vanilla | 6.00 pounds |
| Cinnamon (7 percent moisture) | 6.00 pounds |
| Lecithin | 3.00 pounds |
| Total | 115.00 pounds |

Thus, the flavored coating comprised about 26 percent of the total ingredients before moisture removal. The coated dough mix was then dried to a moisture level of 2.5 percent and is ready to eat as a meal replacement.

EXAMPLE II

The dough formulation of Example I was changed to include the following:

| Percent by weight (as is) | Ingredient |
|---|---|
| Oat Bran | 49.07 |
| Corn Bran | 21.30 |
| Corn Meal | 17.59 |
| Water | 7.41 |
| Cheese Flavor | 4.17 |
| Salt | 0.46 |

The base dough was processed in accordance with Example I and had an expansion ratio of 4:1. The moisture of the dietary product, after drying, was 2.5 percent.

EXAMPLE III

The dough formulation of Example I was changed to include the following:

| Percent by weight (as is) | Ingredient |
| --- | --- |
| Oat Bran | 47.29 |
| Corn Bran | 21.89 |
| Corn Meal | 17.51 |
| Water | 8.06 |
| Fructose | 2.63 |
| Cocoa | 1.75 |
| Vanilla | 0.88 |

The base dough was processed in accordance with Example I and had an expansion ratio of 4:1. The moisture of the dietary product, after drying, was 2.5 percent.

EXAMPLE IV

For this Example, the formulation of Example I was prepared and processed in accord with Example I, except that barley bran was substituted in equal amount for oat bran in the formulation.

A new dietary food product has been provided which can serve as a meal replacement, the product not only serving to provide balanced nutrition, but also providing therapeutic effects. The various features of the invention which are believed new are set forth in the following claims.

What is claimed is:

1. An improved dietary food product made from ground grain source material in expanded form, said expanded dietary food product comprising:

oat bran, corn bran and corn meal in proportions sufficient to provide more than 10 percent protein and more than 20 percent dietary fiber including from about 55 percent to 70 percent soluble dietary fiber and 30 percent to 45 percent insoluble dietary fiber, said expanded food product including from about 45 percent to about 55 percent oat bran having a particle size of from about 40 to about 60 mesh, from about 18 percent to about 25 percent corn bran having a particle size of from about 60 to about 80 mesh, from about 10 percent to about 25 percent corn meal having a particle size of from about 80 to about 100 mesh, and from 0 percent to about 10 percent triticale and said expanded food product having a density of from about 0.15 to about 0.30 grams per c.c.

2. The dietary food product of claim 1 having a calorie content of from about 250 to about 350 calories per 100 grams.

3. The dietary food product of claim 1 having an expansion of from about 1:3 to about 1:5 times.

4. The dietary food product of claim 1 including about 45 percent to about 55 percent oat bran, from about 18 percent to about 25 percent corn meal, and from about 5 percent to about 10 percent triticale.

5. The dietary food product of claim 1 including a food flavoring in the product.

6. The dietary food product of claim 1 wherein barley, bran is substituted for oat bran.

7. The dietary food product of claim 1 coated with a flavoring and having a calorie content of from about 350 calories to about 450 calories per 100 grams.

8. The dietary food product of claim 1 having from about 0.1 percent to about 0.4 percent of a surface active agent and from about 0.5 percent to about 1 percent of an edible oil.

9. The dietary food product of claim 8 wherein said surface active agent is a phospholipid.

10. The dietary food product of claim 9 wherein said phospholipid is lecithin.

11. A method for producing a high fiber content expanded food product comprising preparing an uncooked dough mix which comprises ground oat bran, corn bran and corn meal, said dough mix having from about 45 percent to about 55 percent oat bran having a particle size of from about 40 to about 60 mesh, from about 18 percent to about 25 percent corn bran having a particle size of from about 60 to about 80 mesh, from about 10 to about 25 percent corn meal having a particle size of from about 80 to about 100 mesh, and from 0 percent to about 10 percent triticale, and said oat bran, corn bran and corn meal being present in proportions sufficient to provide more than about 10 percent protein and more than about 20 percent dietary fiber which includes from about 55 percent to about 70 percent soluble dietary fiber and from about 30 percent to about 45 percent insoluble dietary fiber, cooking said dough mix under predetermined conditions of heat and pressure in an extruder so as to cook said dough mix and to cause said dough mix to exit from said extruder at a total moisture level of from about 8 percent to about 12 percent, and to expand said cooked dough mix from about 3 to about 5 times the volume of said uncooked dough mix.

12. A method in accordance with claim 11 wherein said dough mix comprises from about 5 percent to about 10 percent triticale.

13. A method in accordance with claim 11 wherein said dough mix further comprises from about 0.1 percent to about 0.4 percent of a surface active agent and from about 0.5 percent to about 1 percent of an edible oil.

14. A method in accordance with claim 13 wherein said surface active agent is a phospholipid.

15. A method in accordance with claim 14 wherein said phospholipid is lecithin.

16. A method in accordance with claim 11 wherein the total moisture of said uncooked dough mix is from about 14 percent to about 18 percent.

17. A method in accordance with claim 11 wherein the total moisture of said uncooked dough mix is from about 15 percent to about 17 percent.

* * * * *